US007353965B2

(12) United States Patent
Reutter (10) Patent No.: US 7,353,965 B2
(45) Date of Patent: Apr. 8, 2008

(54) CLOSURE CAP PROVIDED WITH ANTI-TWISTING

(76) Inventor: Heinrich Reutter, Theodor-Heuss-Strasse 12, 71336 Waiblingen (DE)

( * ) Notice: Subject to any disclaimer, the term of this patent is extended or adjusted under 35 U.S.C. 154(b) by 62 days.

(21) Appl. No.: 10/332,976

(22) PCT Filed: Jul. 4, 2001

(86) PCT No.: PCT/EP01/07635

§ 371 (c)(1),
(2), (4) Date: May 14, 2003

(87) PCT Pub. No.: WO02/08586

PCT Pub. Date: Jan. 31, 2002

(65) Prior Publication Data

US 2003/0183632 A1    Oct. 2, 2003

(30) Foreign Application Priority Data

Jul. 22, 2000    (DE)    ................................ 100 35 729

(51) Int. Cl.
*B65D 51/16* (2006.01)
(52) U.S. Cl. .............................. 220/303; 220/DIG. 32; 220/DIG. 33; 220/203.28
(58) Field of Classification Search ................ 220/304, 220/DIG. 32, DIG. 33, 251, 303, 316, 203.19, 220/203.24, 203.28
See application file for complete search history.

(56) References Cited

U.S. PATENT DOCUMENTS

| | | | | |
|---|---|---|---|---|
| 4,000,828 A | * | 1/1977 | Crute et al. ............... | 220/203.2 |
| 4,779,755 A | * | 10/1988 | Harris .................... | 220/203.21 |
| 4,887,733 A | * | 12/1989 | Harris .................... | 220/203.06 |
| 5,108,001 A | * | 4/1992 | Harris .................... | 220/203.06 |
| 5,174,463 A | * | 12/1992 | Scharrer ................. | 220/203.26 |
| 5,183,173 A | * | 2/1993 | Heckman ................ | 220/203.07 |
| 5,941,407 A | * | 8/1999 | De'Longhi .................. | 220/316 |
| 6,073,791 A | * | 6/2000 | Reutter ........................ | 220/201 |

(Continued)

FOREIGN PATENT DOCUMENTS

DE    4339663 A1    5/1995

(Continued)

*Primary Examiner*—Anthony D. Stashick
*Assistant Examiner*—James Smalley
(74) *Attorney, Agent, or Firm*—Bacon & Thomas, PLLC (57) ABSTRACT

A pressure cap for openings in tanks, in particular in automobile radiators, has an outer cap component which is provided with a locking element that can be connected to the tank's neck, and provided with a handling element rotatably mounted in relation to said locking element, and furthermore provided with a coupling insert which is anti-rotationally mounted in the handling element and which can be axially engaged in and disengaged from the locking element to allow a releasably non-rotational connection between the locking element and the handling element. The pressure cap is furthermore provided with a valve assembly containing a valve body that can be axially moved back and forth, for releasing and blocking flow connections between the inside and the outside of the tank depending on the pressure prevailing inside the tank. To create an anti-rotation means directly governed by and in time and sequence with the conditions prevailing inside the tank, it is provided that the engaging and disengaging movement of the coupling insert is derived from the pressure-dependent axial movement of the valve body of the valve assembly.

4 Claims, 10 Drawing Sheets

U.S. PATENT DOCUMENTS

| | | | | |
|---|---|---|---|---|
| RE36,959 E | * | 11/2000 | Griffin | 220/210 |
| 6,178,930 B1 | * | 1/2001 | Triberti | 123/41.15 |
| 6,349,842 B1 | * | 2/2002 | Reutter | 220/201 |
| 6,378,717 B1 | * | 4/2002 | Reutter | 220/201 |
| 6,435,367 B1 | * | 8/2002 | Reutter | 220/203.07 |
| 6,796,451 B2 | * | 9/2004 | Harris | 220/203.26 |

FOREIGN PATENT DOCUMENTS

| | | |
|---|---|---|
| DE | G9410556.1 | 5/1995 |
| DE | G9410558.8 | 5/1995 |
| DE | 19946845 A1 | 4/2001 |
| EP | 0163006 A1 | 12/1985 |
| EP | 0400514 A1 | 12/1990 |

* cited by examiner

CLOSURE CAP PROVIDED WITH ANTI-TWISTING

TECHNICAL FIELD

The present invention relates to a pressure cap for openings in tanks, in particular in automobile radiators, with an outer cap component which is provided with a locking element that can be connected to the tank's neck. The pressure cap is also provided with a handling element rotatably mounted in relation to the locking element, with an anti-rotation means provided with a coupling insert. The coupling insert is held non-rotatably in the handling element and can be axially moved back and forth, for the releasable anti-rotational connection of the locking element and the handling element. Included also is a valve assembly containing a valve body that can be axially moved back and forth for releasing and blocking flow connections between the inside and the outside of the tank depending on predetermined values of the pressure prevailing inside the tank.

BACKGROUND OF THE INVENTION

In such pressure caps for openings in tanks, in particular in automobile radiators, which are known from published international application, WO 95/32904, the movement of the coupling insert between the handling element and the locking element of the outer cap component is controlled by the temperature via a memory spring. In such cases, the memory spring lies inside the inner cap component on the side of the valve assembly that faces away from the inside of the tank. It was found that this remote arrangement of the memory spring causes problems and delays in measuring the temperature prevailing inside the tank, which leads to less than satisfactory results in activating and deactivating the anti-rotation means.

SUMMARY OF THE INVENTION

The object of the present invention is to improve a pressure cap of the above kind for openings in tanks, in particular in automobile radiators, such that an anti-rotation means can be created which is directly governed by and in time and sequence with the conditions prevailing inside the tank.

To achieve this object for a pressure cap for openings in tanks, in particular in automobile radiators the axial engaging and disengaging movement of the coupling insert is derived from the pressure-dependent axial movement of the valve body of the valve assembly.

Thus, the anti-rotation means can be activated and deactivated substantially without time delay and directly by deriving the movement directly from the valve body depending on the pressure prevailing inside the tank. Since the pressure inside the tank directly affects the respective valve body of the valve assembly, there is also a direct effect on the activation and deactivation of the anti-rotation means.

In one preferred embodiment of the present invention, an axial first compression spring is provided between the valve body and the coupling insert. A guidance element is also provided between the valve body and the coupling insert whose one end sits on the valve body and whose other end can be axially moved in relation to the coupling element and engages in same. The axial first compression spring is held between the guidance element and the coupling element, with the guidance element being axially movable and coupled with the coupling insert in the direction of the effect of the first compression spring. A second compression spring is also provided between the guidance element and the inner cap component, wherein axially extending teeth are provided on the outer circumference of the coupling insert and on the inner circumference of the locking element are provided. In this preferred embodiment, the anti-rotation means is activated by transmitting the movement via a compression spring, while the return to its deactivated position is accomplished by a combination of compression spring and traction mechanism.

In another preferred embodiment of the present invention, has a movement-transmitting element between the valve body and the coupling insert, whose one end adjoins the valve body and whose other end adjoins the coupling insert. The coupling element and the end of the movement-transmitting element which faces the former have mutually adjoining fingers which engage in axial recesses of the locking element. The coupling element is acted upon by a compression spring which is supported on the inside of the handling element are provided. In this preferred embodiment, the anti-rotation means is activated by a rigid movement transmission from the valve body to the coupling insert, while the return to its deactivated non-rotational position is accomplished via a counter-compression spring.

BRIEF DESCRIPTION OF THE DRAWINGS

Further details of the invention are provided in the following description in which the invention is explained in detail with reference to the drawings, where.

DESCRIPTION OF THE PREFERRED EMBODIMENT

Pressure cap 111, 211 shown in the drawings by example of two embodiments for a tank such as an automobile radiator has an outer cap component 110, 210 which is provided with a handling, element or handling means 112, 212 to whose locking element 113, 213 (shown here as a screw-on element) an inner cap component 114, 214 with a pressure-relief/vacuum valve assembly 115, 215 is rotatably suspended. When in use, the pressure cap 111, 211 is fixed or screwed to a radiator neck (not shown). Inner cap component 114, 214 protrudes from the radiator neck into the inside of the radiator. An O ring 116, 216 seals the inner cap component 114, 214 against the wall of the radiator. In the two-piece outer cap component 110, 210, the cap-like handling means 112, 212 is axially fixed to the screw-on element 113, 213, although it can be rotated in circumferential direction. When there is normal pressure inside the radiator, this rotatability is blocked by an axially movable coupling insert 180, 280 for screwing and unscrewing pressure cap 111, 211.

In the embodiment shown in FIG. 1 to 5, the pressure-relief part of the valve assembly 115 is designed in two steps. In a first overpressure step, it has the function of preventing the radiator from boiling dry, and in a second overpressure step it prevents damage to the radiator system due to excessive overpressure. The pressure-relief part of the valve assembly 115 is provided with a single valve body 117, which is axially movable inside the inner cap component 114 between two end positions. Valve body 117 has a contoured ring seal 118 with an axially acting sealing surface arrangement 120 and a radially acting sealing surface arrangement 121. Valve body 117 is axially biased toward the inside of the tank by means of a compression spring 122 which is supported by the inner cap component 114.

Figure 1:
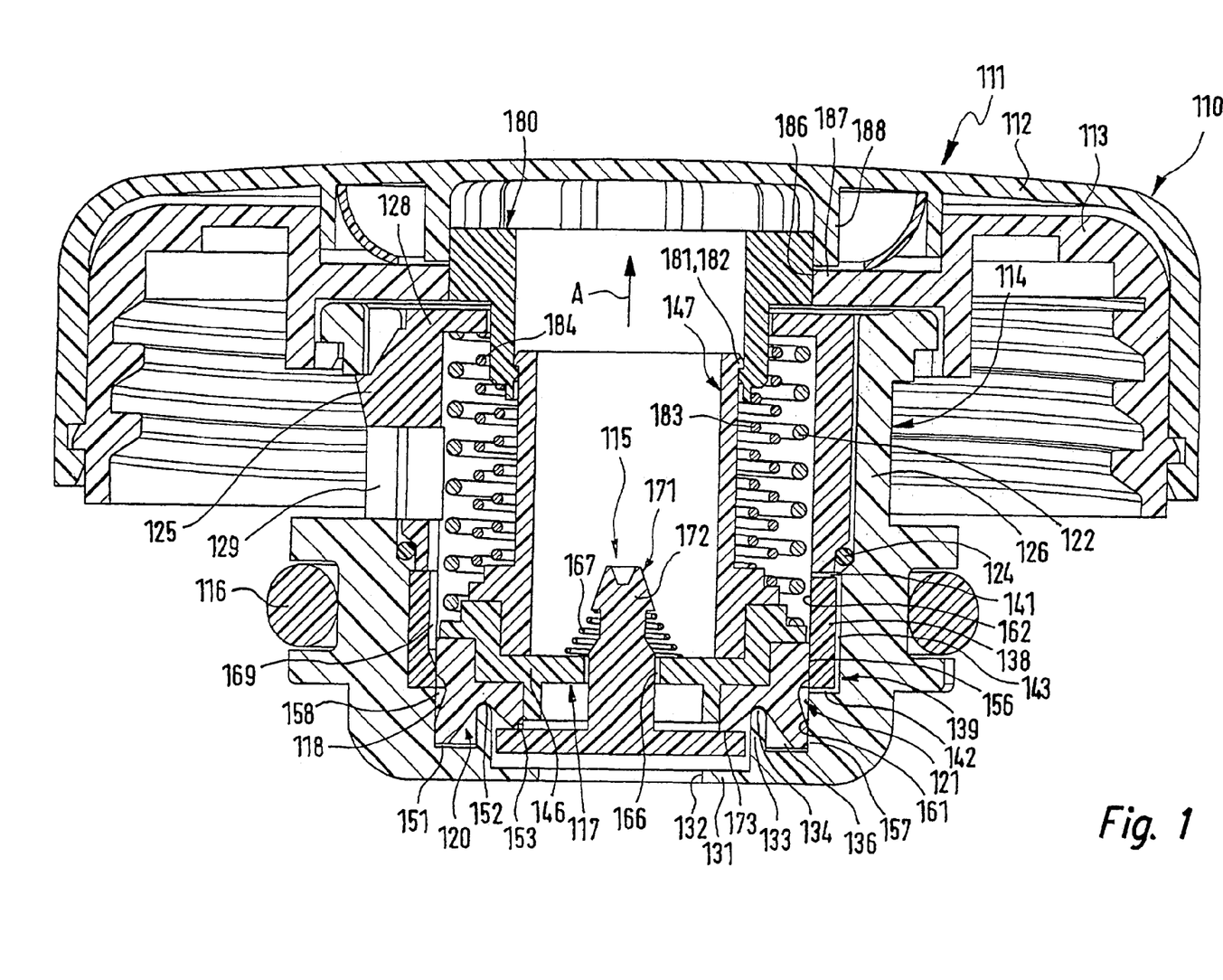
FIG. 1 is a longitudinal section through a pressure cap for an automobile radiator with a pressure-relief/vacuum valve assembly and an anti-rotation means in closed, i.e. non-activated initial position, according to a first preferred embodiment of the present invention.

Inner cap component 114 is designed in two parts, namely an inner element 125 and an outer main element 126 which is suspended in the screw-on element 113 of outer cap component 110 and in which the fixed inner element 125 is sealed. Inner element 125 has the approximate shape of a hood with an axial opening in the hood floor 128 by whose inside one end of compression spring 122 is supported. At approximately the level of the lower end of the outer cap component 110, the outer circumference of inner cap component 114 is provided with escape openings 129. Between the inner element 125 and the main element 126, an O ring 124 is provided to ensure a tight connection.

Floor 131 of main element 126 of inner cap component 114 has a coaxial flow-through opening 132 which forms a connection between the inside of the tank and the inside of the interior cap component 114. Flow-through opening 132 is coaxially surrounded by an annular lug 133 whose free annular face forms a sealing seat 134 for the axial sealing surface arrangement 120 of contoured ring seal 118 of valve body 117. An annular space 136 remains between the outer circumference of annular lug 133 and the inner circumference of main element 126. Above that annular space 136, between the lower annular face of inner element 125 and a recess in the main element 126 of inner cap component 114, an annular insert is accommodated which contains a U shaped throttle channel 139 or forms such a channel with its adjacent components. In the embodiment shown, the U shaped throttle channel 139 is provided in a place on the circumference of inner cap component 114. Throttle channel 139 has two radial channel parts arranged at an axial distance: 141 (adjacent to inner element 125) and 142 (adjacent to the recess in main element 126), which are connected by an axial channel part 143 located between the associated inner circumference section of main element 126 and the associated outer circumference section of annular insert 138. Here, the channel parts 141, 142 and 143 are formed by radial or axial grooves cut into the annular insert 138.

One-part valve body 117 has a radially stepped main part 146 in axial direction, which carries the contoured ring seal 118, and on which—facing away from the contoured ring seal 118—sits a guidance element 147 which is hollow cylindrical and engages in the hollow coupling insert 180. Compression spring 122 is supported on a radial outer shoulder of main part 146 of valve body 117.

On the inner surface of the stepped outer circumference of valve body 117, the contoured ring seal 118 is fastened. Seen in cross section, the axial sealing surface arrangement 120 of contoured ring seal 118 is vault-shaped and has a radially outer sealing surface 151, a radially central sealing surface 152 and a radially inner sealing surface 153. The radially inner sealing surface 153 interacts with a vacuum valve body 171, which will be described below, while the radially central sealing surface 152 in rest position bears on the sealing seat 134 of inner cap component 114 and the radially outer sealing surface 151 lies on the floor of annular space 136. On the other hand, the radial sealing surface arrangement 121 has two sealing surfaces 156 and 157 arranged at a certain axial distance, between which a cut-out 158 is provided. The upper sealing surface 156 as well as the lower sealing surface 157, which turns into the radially outer sealing surface 151, are sealingly adjoining the inner wall 161 which is formed as a sealing seat, and/or 162 of main element 126 of interior cap component 114 or annular insert 138.

One inner end of guidance element 147 sits on the outer surface of the inside shoulder of valve body 117, while its other end extends into the centered through-hole of coupling insert 180. Coupling insert 180 and guidance element 147 are mutually rotatable and can slide axially toward each other. As FIG. 1 shows, the axial slidability is limited by the adjoining shoulders 181, 182 such that guidance element 147 and coupling insert 180 always engage each other. Guidance element 147 is designed as a sleeve whose outer circumference at the inner end facing valve body 117 is stepped to form contact shoulders for an axial spring coupling means. The spring coupling means has a first inner pressure coil spring 183 which is arranged with bias between coupling insert 180 and guidance element 147, and a second outer pressure coil spring 184 whose one end is supported by guidance element 147 and whose other end is supported by inner element 125 of inner cap component 114. These two pressure coil springs 183 and 184 are surrounded by pressure coil spring 122 which acts upon valve body 117.

The axially slideable coupling insert 180, whose lower end, which overlaps guidance element 147, passes through a central through-hole of inner element 125 of inner cap component 114, has an outer end with a larger diameter. As shown in FIG. 1, this end lies within a recess 186 of a radial flange 187 of screw-on element 113 and within a centered ring flange 188 which protrudes axially toward the inside. Coupling insert 180 is non-rotationally connected to the axial flange 188 on the handling means 112, for example through intermeshing peripheral teeth. In the initial position shown in FIG. 1, the coupling insert 180 is also non-rotationally connected with the radial flange 187 of screw-on element 113, also via peripherally and axially extending tooth arrangements (not shown). In this manner, the handling means 112 and the screw-on element 113 are non-rotatably connected with each other in circumferential direction, such that the pressure cap 111 can be screwed on and off the neck (not shown) of a tank with handling means 112.

In the centre of valve body 117, an opening 166 is provided which is on the side facing the inside of the radiator is closed by the vacuum valve body 171 of valve assembly 115. Main part 172 of vacuum valve body 171 protrudes through central opening 166, and its end section is acted upon by a compression spring 167 which is supported at one end by a shoulder of main part 172 and at the other end by the outer surface of the inner shoulder of valve body 117. In this manner, the annular sealing seat 173 of vacuum valve body 171 is sealingly adjoining the radially inner sealing surface 153 of the axial sealing surface arrangement 120 of contoured ring seal 118 of valve body 117.

In the rest position (initial operating position) shown in FIG. 1, when there is no overpressure inside the tank yet, any flow connection between the inside and the outside of the tank is closed by the fact that all sealing surfaces 151 to 153 of the axial sealing surface arrangement 120 of contoured seal 118 of valve body 117 sealingly adjoin the corresponding sealing seats 136, 134, 173 of inner cap component 114 or vacuum valve body 171. In other words, at contoured ring seal118 of valve body 117 as well as on the underside of vacuum valve body 171, the normal (ambient) pressure in the form of the air cushion above the liquid coolant prevails through flow-through opening 132.

Figure 2:
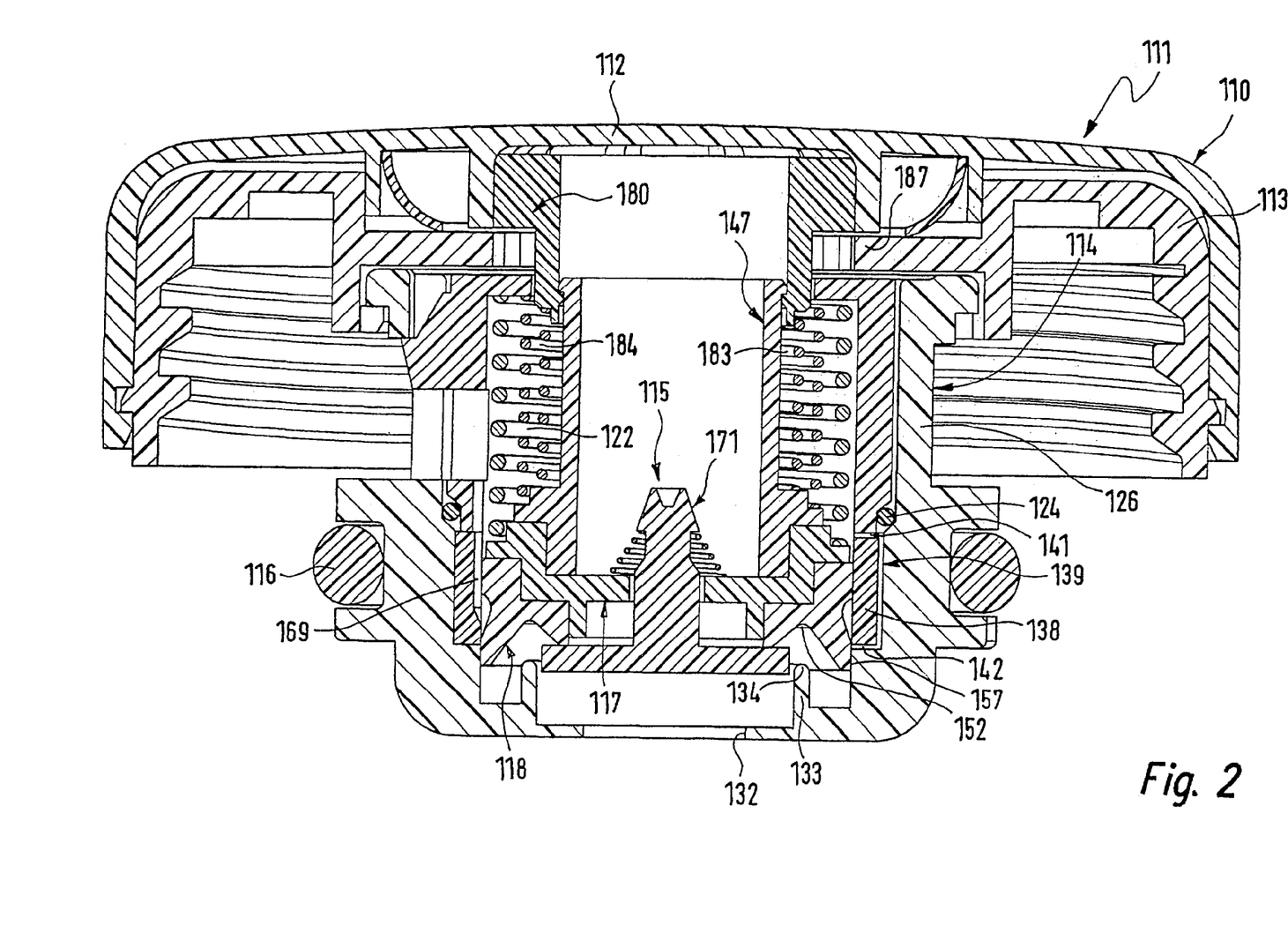
FIG. 2 is a view that corresponds to that in FIG. 1, but showing a position while pressure is building up inside the tank.

When the pressure inside the tank rises to a certain level above normal pressure, but below a first threshold, the unscrew protection means of pressure cap 111 is activated. As shown in FIG. 2, valve body 117 is moved upward, such that the contoured ring seal 118 with its central sealing surface 152 is lifted off sealing seat 134. Thus, the effective surface acted upon by overpressure, which until then was formed only by the underside of vacuum valve body 171, is enlarged by the inner axial surface of the contoured ring seal 118. This enlarged effective surface means that a greater force is acting upon valve body 117 while the pressure remains the same, resulting in greater lift for the valve body. Due to the lift movement of valve body 117, which however does not yet open throttle channel 139, against the effect of the first pressure coil spring 183 and the second pressure coil spring 184, the guidance element 147 is initially displaced axially in relation to coupling insert 180. Since this lift movement biases the first pressure coil spring 183 which is supported by coupling insert 180, coupling insert 180 is axially displaced. This axial outward movement of coupling insert 180 in the direction of Arrow A and up to an inner stop on the underside of handling means 112 causes the end of coupling insert 180 with the larger outer diameter to disengage from the teeth on screw-on element 113. This disengagement of coupling insert 180 has the effect that the handling means 112 idles in relation to screw-on element 113, such that above a certain defined overpressure (in this case, for example, 0.3 bar), pressure cap 111 can no longer be unscrewed.

Figure 3:
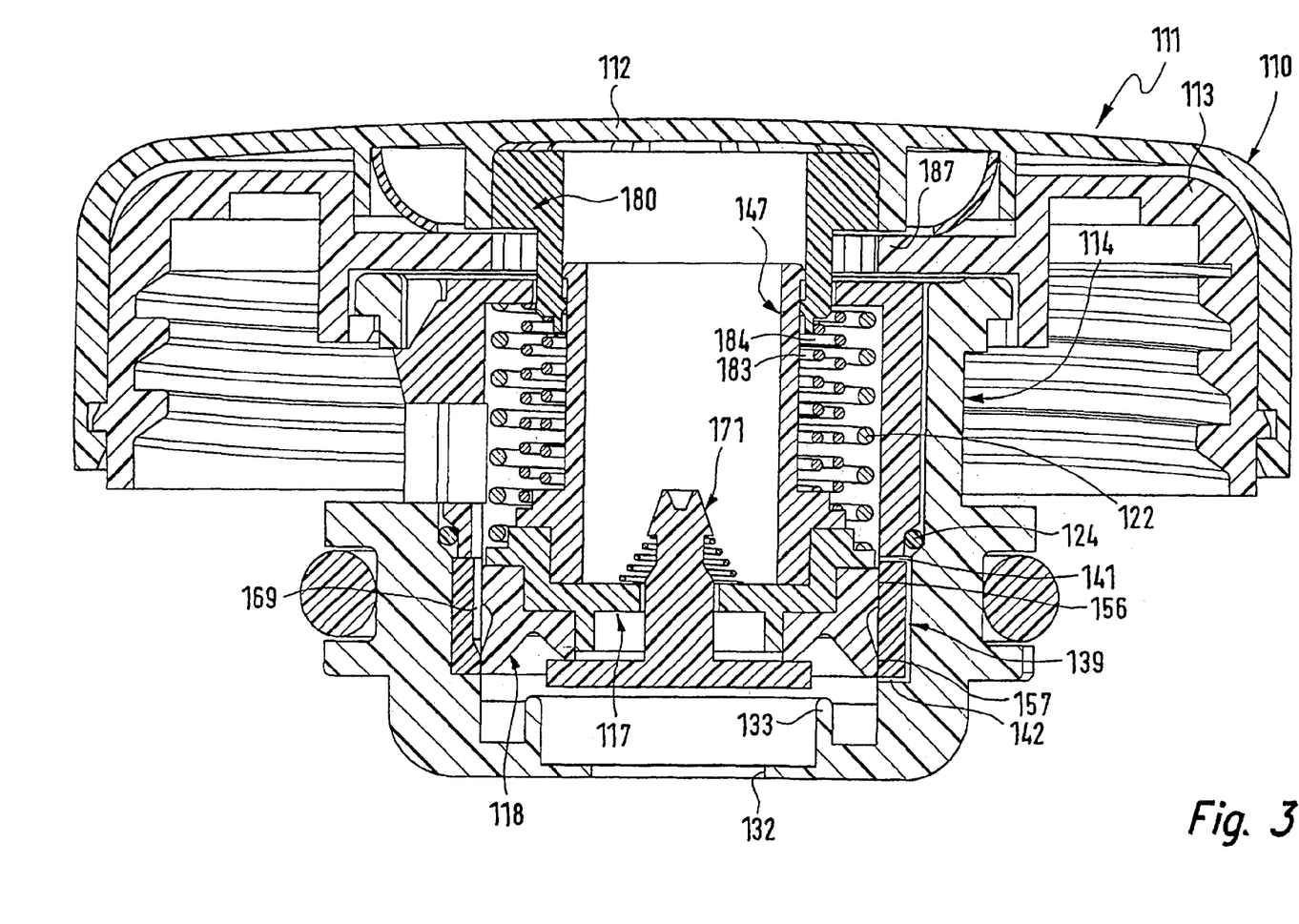
FIG. 3 is a view that corresponds to that in FIG. 1, but showing a position after the pressure inside the tank exceeds the first threshold value but before it reaches a second threshold value.

If the pressure inside the tank increases further, i.e. above the predetermined first threshold value (e.g. 1.4 bar), valve assembly 115 of pressure cap 111 reaches the operating state shown in FIG. 3 according to which valve body 117 continues to lift against the effect of its compression spring 122, and the contoured ring seal 118 moves into the range of annular insert 138, such that the two radial sealing surfaces 156 and 157 of the radial sealing surface arrangement 121 of contoured ring seat 118 of valve body 117 are below/above the radial channel parts 141 and 142 and thus open throttle channel 139 on both sides. In this state, in which the unscrew protection means remains activated, an equilibrium has occurred between the effect of the pressure inside the tank and the counter effect of compression spring 122. Thus, the first flow connection between the inside and the outside of the tank is open, which leads from flow-through opening 132 via the U-shaped throttle channel 139 to the escape openings 129. This means that air can flow outside from the air cushion above the liquid coolant and compensate or reduce the overpressure. If this reduces the overpressure below the first threshold value, valve body 117 is again moved to sealingly adjoin the axial sealing seat 134 of inner cap component 114.

If on the other hand, the pressure inside the tank continues to rise during or after the escape of the air cushion, and if this causes liquid coolant to reach the underside of contoured ring seal 118 and vacuum valve body 171, the fact that throttle channel 139 is very narrow (e.g. a cross section measuring only a few hundredths of a millimeter), causes the coolant to back-up at the entrance to the lower radial channel part 142 of throttle channel 139, and therefore causes dynamic pressure on the full-surface undersides of contoured ring seal 118 and vacuum valve body 171. This dynamic pressure leads to an axial movement of valve body 117 against the effect of compression spring 122, such that in this state (e.g. of 1.4 bar), throttle channel 139 is closed again (in a manner not shown) at upper channel part 141 by the upper radial sealing surface 156 of contoured ring seal 118. The unscrew protection means continues to be activated. This prevents the discharge of liquid coolant. If the pressure inside the tank is reduces through cooling and the liquid coolant is returned, valve body 117 can also be returned under the effect of its compression spring 122, such that throttle channel 139 opens again and the pressure can be reduced further.

Figure 4:
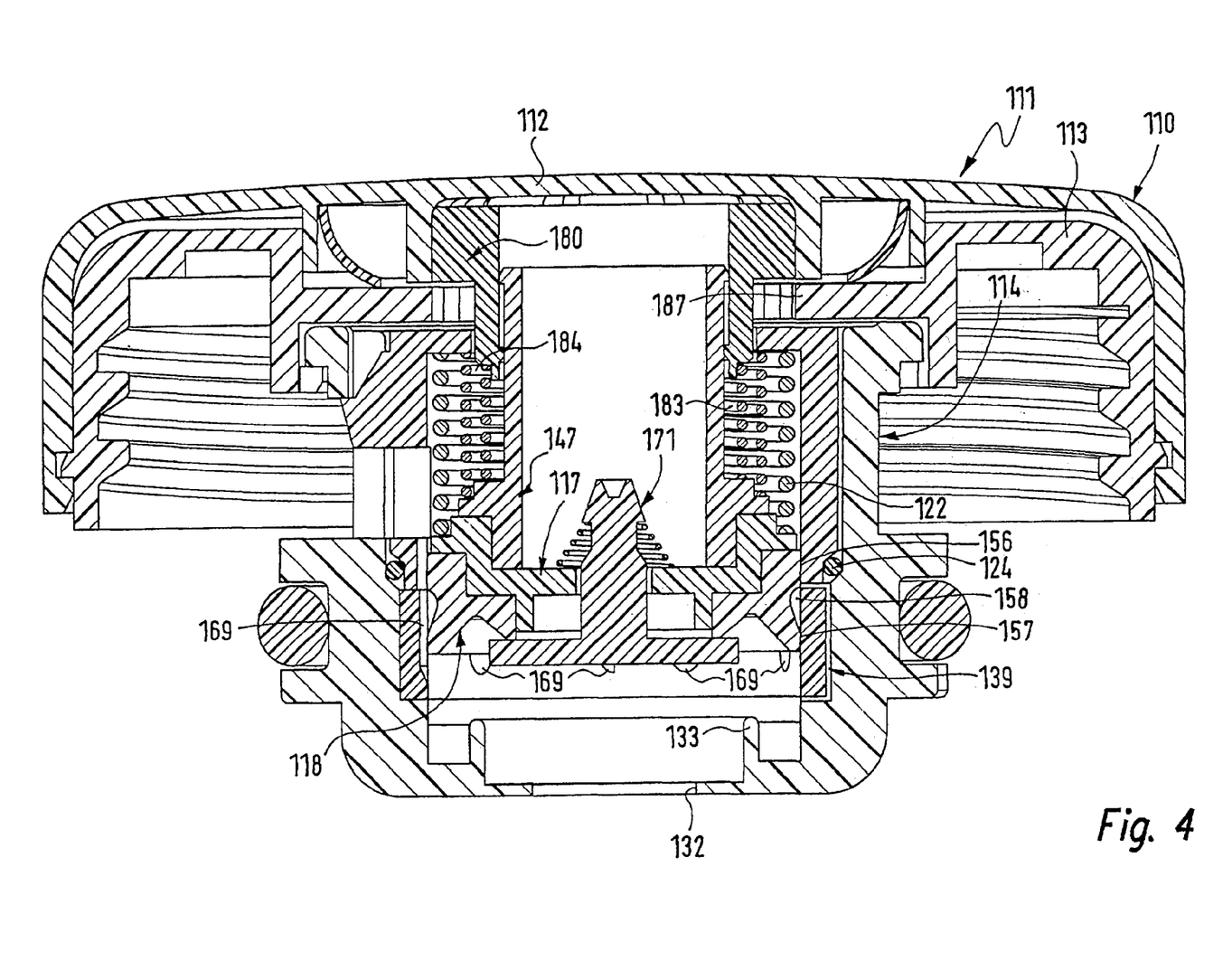
FIG. 4 is a view that corresponds to that in FIG. 1, but showing a position after the pressure inside the tank exceeds a third threshold value which constitutes the safety limit.

If, on the other hand, the pressure inside the tank continues to rise, valve body 117 is lifted further against the action of compression spring 122 when an upper (safety) threshold (e.g. of 2 bar) is exceeded, such that axial escape channels 169—situated in certain circumferential sections in the wall of annular insert 138 and of the inner element 125 of inner cap component 114—are opened which are connected to escape opening 129 and thus with the outside of the tank (FIG. 4). In that state, the upper channel part 141 remains closed as before. This upper end position of valve body 117 is limited by the compressed compression springs 122, 183 and 184. The unscrew protection means remains activated. This means that the said overpressure can be reduced via a second flow connection, after which valve body 117 can be returned through the various operating states by compression spring 122, as shown in FIG. 5.

Figure 5:
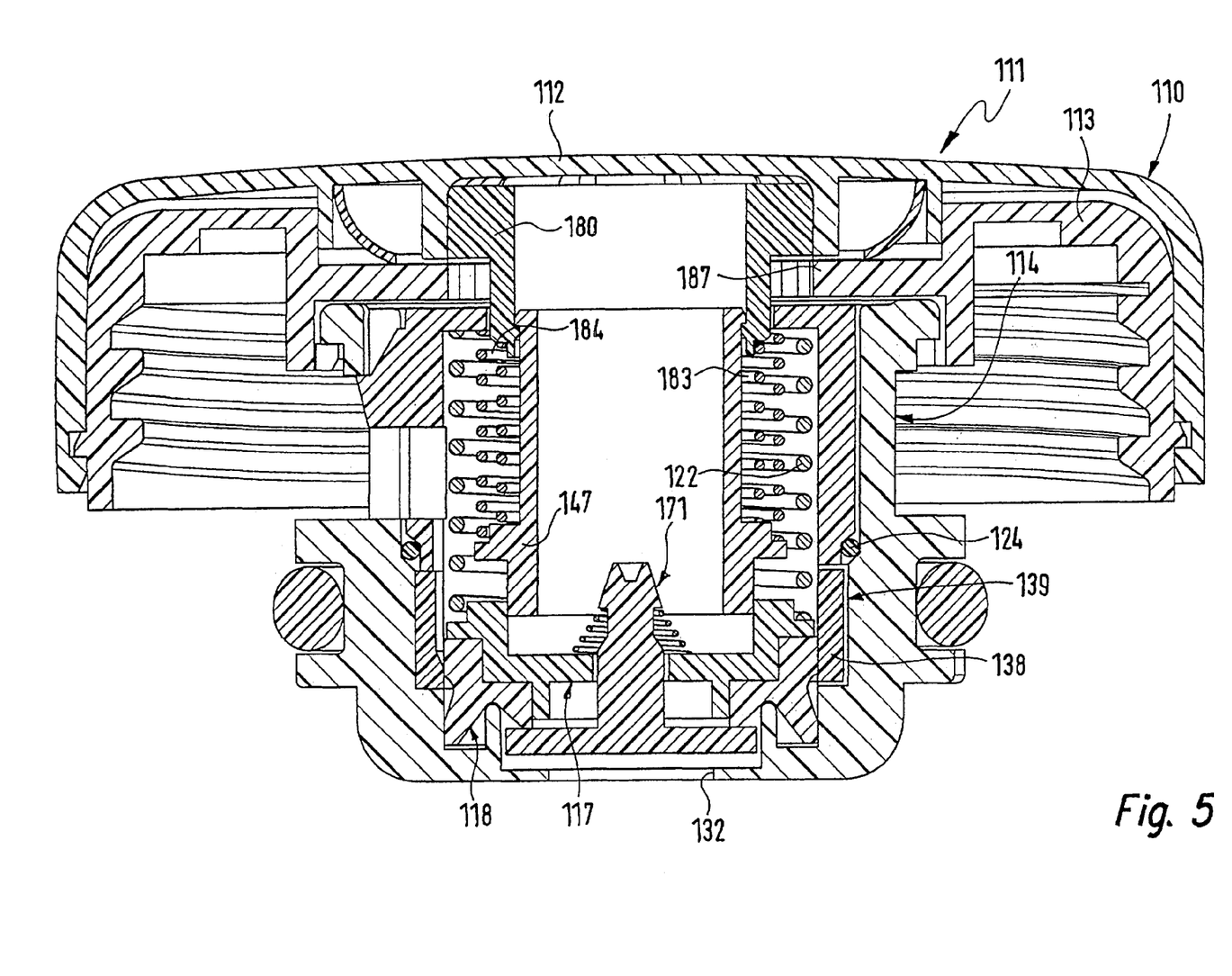
FIG. 5 is a view that corresponds to that in FIG. 1, but showing a position after normal pressure is reached inside the tank and before the anti-rotation means is returned to its deactivated position.

FIG. 5 also shows a possible short-term state of the unscrew protection means when valve body 117 has returned to its initial position and when the handling means 112 was rotated while the activation of the unscrew protection means was activated. In that case, it could have happened that the teeth of coupling insert 180 are not exactly above the tooth spaces of screw-on element 113. To return the unscrew protection means from its activated state into its deactivated state, as shown in FIG. 1, it is enough to give handling means 112 a short turn, which has the effect that the second pressure coil spring 184, which is under considerable bias, moves guidance element 147 down against the direction indicated by Arrow A. This releases the inner first compression spring 183, while the outer ring shoulder 181 of guidance element 147 adjoins the inner ring shoulder 182 of coupling insert 180 and carries the latter along against the direction indicated by Arrow A, such that the coupling connection between handling means 112 and screw-on element 113 engages again and becomes effective. Thus, the exact operating position shown in FIG. 1 is reached, and pressure cap 111 can be safely unscrewed from the neck of the radiator.

Valve assembly 115 assumes the initial position shown in FIG. 1 when the pressure inside the radiator ranges between a vacuum threshold and a very slight overpressure threshold of (in this case) less than 0.3 bar. Such pressure conditions prevail, for example, in a vehicle that was parked for a long period, or when the vehicle is driven while the coolant inside the radiator is sufficiently cooled by the headwind and/or the fan. If the vehicle is parked after a long drive, the pressure may rise inside the radiator causing the contents of the radiator (air, water or water vapour) to flow into valve assembly 115. If as a result of this after-heating effect, the coolant volume expands so much that it exceeds the volume of the radiator, this necessarily leads to a discharge of coolant. This undesirable effect is prevented in the manner described above. If in this operating state, the pressure in the cooling system continues to rise in an uncontrolled fashion, leakages and other detrimental effects due to excessive demands on the radiator and/or its hose connections must be prevented. Such effects are prevented through the second valve step as shown in FIG. 4, where the radiator pressure is limited to a predetermined safety threshold value.

If in case of an operating state as shown in FIG. 1 there is a vacuum inside the radiator, and this vacuum falls below a predetermined vacuum threshold value, the sealing seat 173 of vacuum valve body 171 is lifted off the radially inside sealing surface 153 of contoured ring seal 118 of valve body 117 toward the inside of the radiator. Vacuum pressure valve 171 is lowered against the bias of compression spring 167, such that a third flow connection (not shown) is opened between the inside and the outside of the radiator.

According to the embodiment shown in FIG. 6 to 10, the pressure-relief valve of valve assembly 215 is designed in two parts, and its function is to prevent (in a first overpressure step) the radiator from boiling dry, and (in a second overpressure step) to ensure protection against damage to the radiator system due to excessive overpressure. The pressure-relief part of valve assembly 215 inside inner cap component 214 has a first valve body 217, a second valve body 218, and a third valve body 219. The first valve body 217 is arranged in the direction of the outside of the cap above the second valve body 218, while the third valve body 219 is accommodated coaxially within the second valve body 218.

Figure 6:
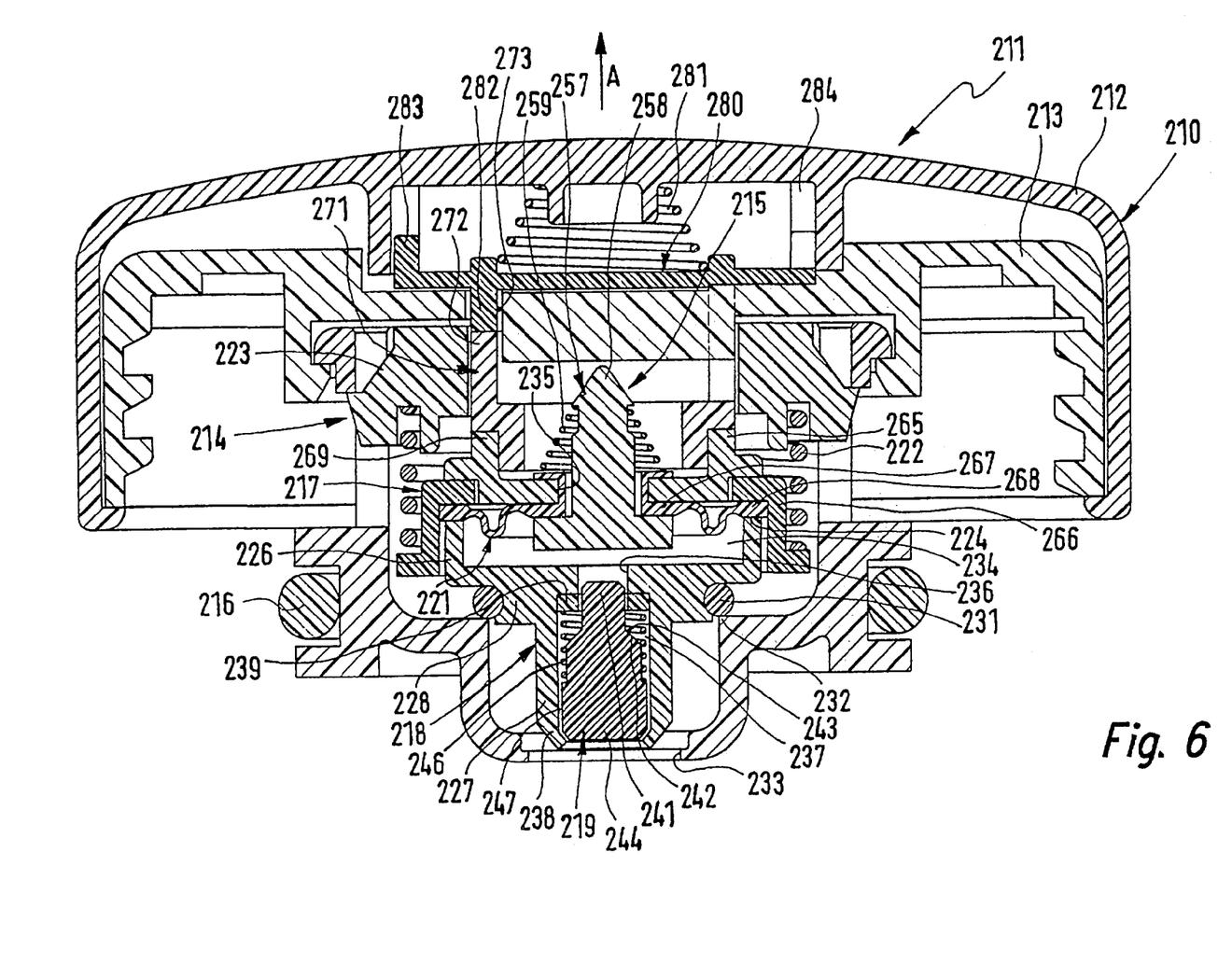
FIG. 6 is a longitudinal view of a pressure cap for an automobile radiator with a pressure-relief/vacuum valve assembly in closed initial position and with an engaged non-rotation means according to a second preferred embodiment of the present invention.

The first valve body 217, which is designed in two parts, has a radially inner valve body part 265 approximately in the shape of a valve disk, and a radially outer valve body part 266. These two parts overlap at the edge, whereby the radially inner part sits on the radially outer valve body part. On the side of the two valve body parts 265, 266 facing toward the inside of the radiator, an annular membrane seal 221 is arranged which is provided with sealing surfaces facing axially inward. The radially outer stepped valve body part 266 of the first valve body 217, on a side facing away from the inside of the radiator, is acted upon by a recoil spring 222 whose end facing away from the first valve body 217 is supported by a spring plate 223 which in turn is supported by inner cap component 214. The radially outer valve body part 226 of the first valve body 217 is biased in the direction of the inside of the radiator by means of recoil spring 222. Above the radially outer flat sealing edge 268 of membrane seal 221 sits the radially outer valve body part 226 on a first annular sealing seat 224 of the second valve body 218. The radially inner valve body part 265 of first valve body 217 has a central recess 237 whose annular limiting edge is surrounded by the inner part of membrane seal 221. Toward the inside of the radiator, this radially inner U shaped sealing edge 267 of membrane seal 221 forms a sealing surface for a vacuum valve 257 still to be described. On the side of the outer edge, the inner valve body part 265 bears on the inner edge of the radially outer valve body part 266 of first valve body 217.

The radially inner valve body part 265 is provided near its radial outer edge with an axially protruding annular rim 269 on which a guidance sleeve 271 sits which is rotatable in relation to valve body 265. The inner end of guidance sleeve 271 is curled over and overlaps annular rim 269 radially inside. Bearing on the other axial end of guidance sleeve 271, which end is formed by single one-piece protruding fingers 272, is coupling insert 280 under the effect of a compression spring 281 which is supported on the inside of handling element 212 of outer cap component 213. Coupling insert 280 has a disk 285 which is proved with axially downward extending finger-shaped claws whose cross section corresponds to fingers 272 of guidance sleeve 271. When no pressure prevails inside the radiator, as shown in FIG. 6, fingers 272 of guidance sleeve 271 as well as claws 282 of coupling insert 280 engage in axial recesses 273 of locking element 210 of outer cap component 213. Furthermore, coupling insert disk 285 is provided axially toward the outside, i.e. facing away from claws 282, with protruding claws 283 which grip in positive connection between axially directed circumferential teeth 284 of handling means 212. The inwardly directed claws 282 lie on a radially inner ring, while the axially outward-pointing claws 283 lie on a radially outer ring. In the initial or normal position shown in FIG. 6, a non-rotational connection exists via coupling insert 280 between handling element 212 and locking element 210 of outer cap component 213, such that pressure cap 211 can be screwed to and unscrewed from the neck (not shown) of a radiator.

The one-piece second valve body 218 has a hood part 226 whose free face is provided with the first sealing seat 224, and a concentric and hollow-cylindrical receptacle part 227 pointing from floor 228 of hood part 226 to the inside of the radiator for the third valve body 219. The outer circumferential side of floor 228 between hood part 226 and receptacle part 227 is provided with a flange in whose circumferential groove a second ring seal in the form of an O ring 231 is accommodated. O ring 231 is provided with a second sealing seat 232 which is formed by a collar rim on inner cap component 214. This collar ring 232 is formed between a hollow-cylindrical upper part of inner cap component 214 (of greater inside diameter and accommodating the first valve body 217 and the hood part 226 of second valve body 218) and a lower part of inner cap component 214 (of smaller inside diameter and surrounding the receptacle part 227 of second valve body 218). In this lower section, the inner cap component 214 is provided with an axial opening 233. The radially outer valve body part 266 of the first valve body 217 with sealing ring 268 of the first annular seal 221 is pressed by recoil seal 222 against the first sealing seat 224 of the second valve body 218, whose second ring seal 231 in turn is pressed against the second sealing seat 232 on inner cap component 214.

Located between the underside of first ring seal 221 and the upper side of floor 228 of the second valve body 218 is a cylindrical chamber 234 whose outer circumference is constant in axial direction between floor 228 and the underside of the first ring seal 221. Chamber 234 is in communication in the middle via a hole 236 in floor 228 with a recess 237 in the second valve body 128. In a conical section arranged at one free end of receptacle part 227, recess 237 enters the axial opening 233 of inner cap component 214. Between hole 236 and recess 237, the second valve body 218 is provided with a shoulder which is facing toward the inside of the radiator and holding a third flat ring-shaped seal 239.

The third valve body 219, which is designed, for example, as a rotational part with a stepped circumference in axial direction, is accommodated with axial movement in recess 237 of second valve body 218. The third valve body 219 has a neck area 241 of smaller diameter which is movable in hole 236 and within the third annular seal 239, and it also has a shoulder region 242 whose slanted shoulder forms a third annular seal 243 assigned to the third annular seal 239 on second valve body 218, and it also has a cylindrical ventral region 244 which is supported in a manner not shown in detail by the inside wall of conical section 238 of the second valve body 218. For this purpose, within recess 237 a second compression spring 246 is provided whose one end is supported by a shoulder between the shoulder region 242 and the ventral region 244. The third valve body 219 is biased in the direction of the inside of the radiator by the second compression spring 246. Between the ventral region 244 of the third valve body 219 and in inner circumference of recess 237 of the second valve body 218 there is an annular gap 247 of very narrow width, i.e. only a few hundredth of a millimeter wide. As are hole 236 and chamber 234, the annular gap 247 is part of a first flow connection 250 between the inside and the outside of the cap. A second glow connection 251 bypasses the outer circumference of second valve body 218 (see FIG. 10).

In the centre of the radially inside valve body part 265 of first valve body 217 there is an opening 256, whose side facing the inside of the radiator is closed by vacuum valve body 257 of valve assembly 215. The main part 258 of vacuum valve body 257 protrudes through central opening 256 in whose end section it is acted upon by a third compression spring 259 which is supported at one end by a shoulder of main part 258 and at the other end by the outer surface of the radially inner valve body part 265. In this manner, the annular sealing seat 261 of vacuum valve body 257 is sealingly adjoining the underside of the radially inner sealing edge 267 of the first ring seal 221 of the first valve body 217. Sealing seat 261 of vacuum valve body 257 lies radially inside the first sealing seat 224 of second valve body 218, while the latter lies radially outside the second sealing seat 232 of inner cap component 214 and the latter in turn lies radially outside the third sealing seat 243 on the third valve body 219. All sealing seats 224, 232, 243, 261 point axially outward, while all sealing seats surfaces 221, 231, 239 point axially inward.

In the initial operating position shown in FIG. 6, in which the pressure inside the radiator has not yet exceeded a first threshold value, the first flow connection 250 is closed by the sealing contiguity of the first annular or membrane seal 221 of first valve body 217 to the first sealing seat 224 of second valve body 218. In other words, in chamber 234 and thus on the underside of the first ring seal 221 of first valve body 217, the pressure inside the radiator in the form of the air cushion above the liquid coolant prevails through annular gap 247. The second flow connection 251 along the outer circumference of second valve body 218 is closed by the sealing contiguity of the second seal 231 of second valve body 218 to the second sealing seat 232 of inner cap component 214.

Figure 7:
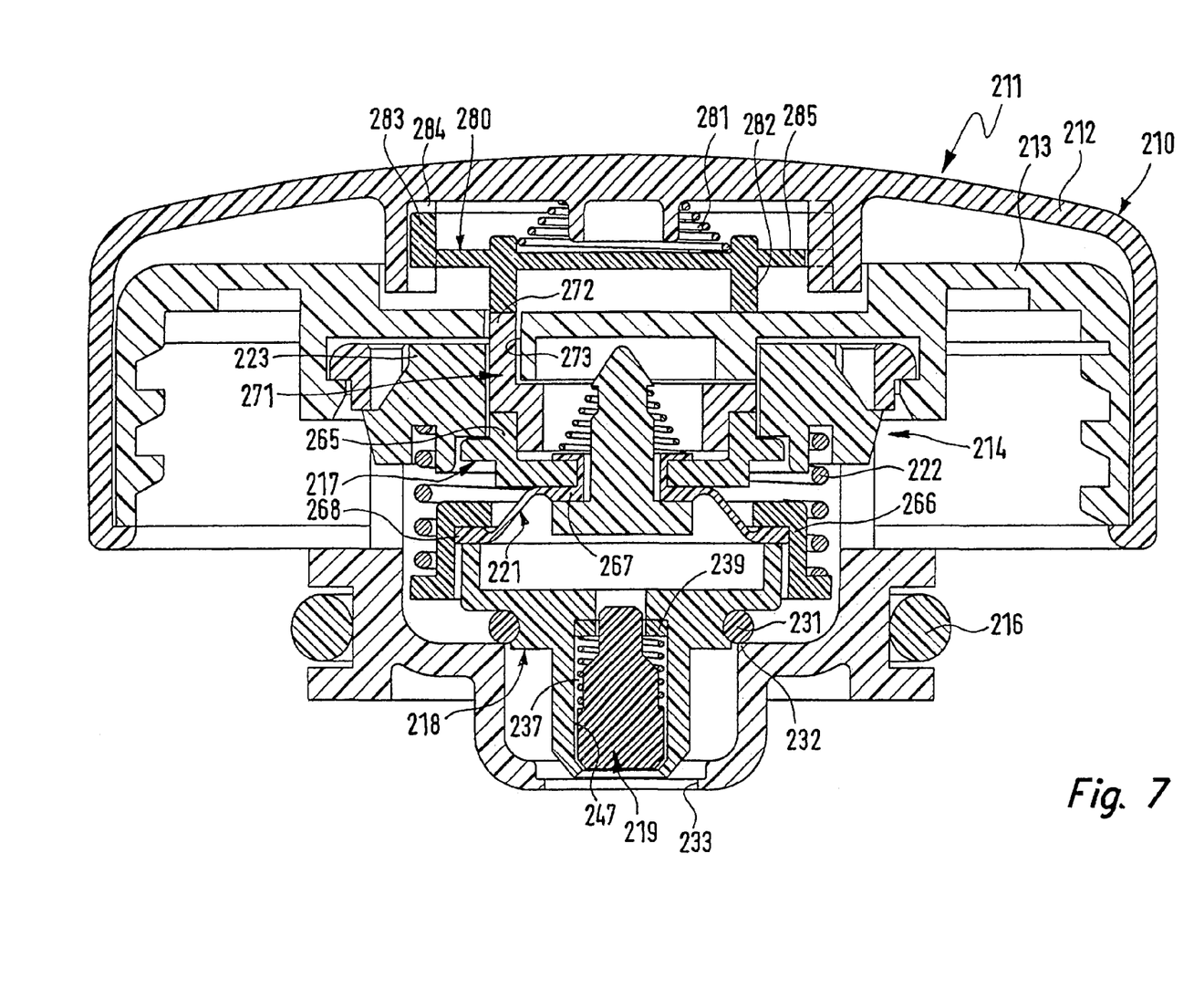
FIG. 7 shows the pressure cap as in FIG. 6 in a position at a slight overpressure inside the tank and with the anti-rotation means deactivated.

If the pressure inside the radiator increases to a certain point above the normal or ambient pressure, but below a first threshold value for pressure inside the radiator, the unscrew protection means of pressure cap 211 is activated. As shown in FIG. 7, the radially inner valve body part 265 of first valve body 217 is moved upward, while the second valve body 218 remains in its sealing position. Furthermore, the radially outer valve body part 266 of first valve body 217 remains in its sealing position in relation to the second valve body 218. The membrane annular seal 221 allows this relative movement between the radially inner valve body part 265 and the radially outer valve body part 266 because this seal has a meandering shape between its two sealing edges 267 and 268. As the radially inner valve body part 265 moves outward in the direction of Arrow A, it carries along guidance sleeve 271 which in turn moves coupling insert 280 against the effect of compression spring 281 while its fingers 272 push the axially inward-directed claws 282 out of recesses 283 in locking element 210. This axial movement comes to an end when the inner shoulder of guidance sleeve 271 strikes against locking element 210. This disengagement of coupling element 280 from locking element 210 of outer cap component 213 has the effect that handling element 212 idles in relation to locking element 210, such that starting at a predetermined overpressure (in this case, for example, 0.3 bar) pressure cap 211 can no longer be unscrewed from the radiator's neck.

Figure 8:
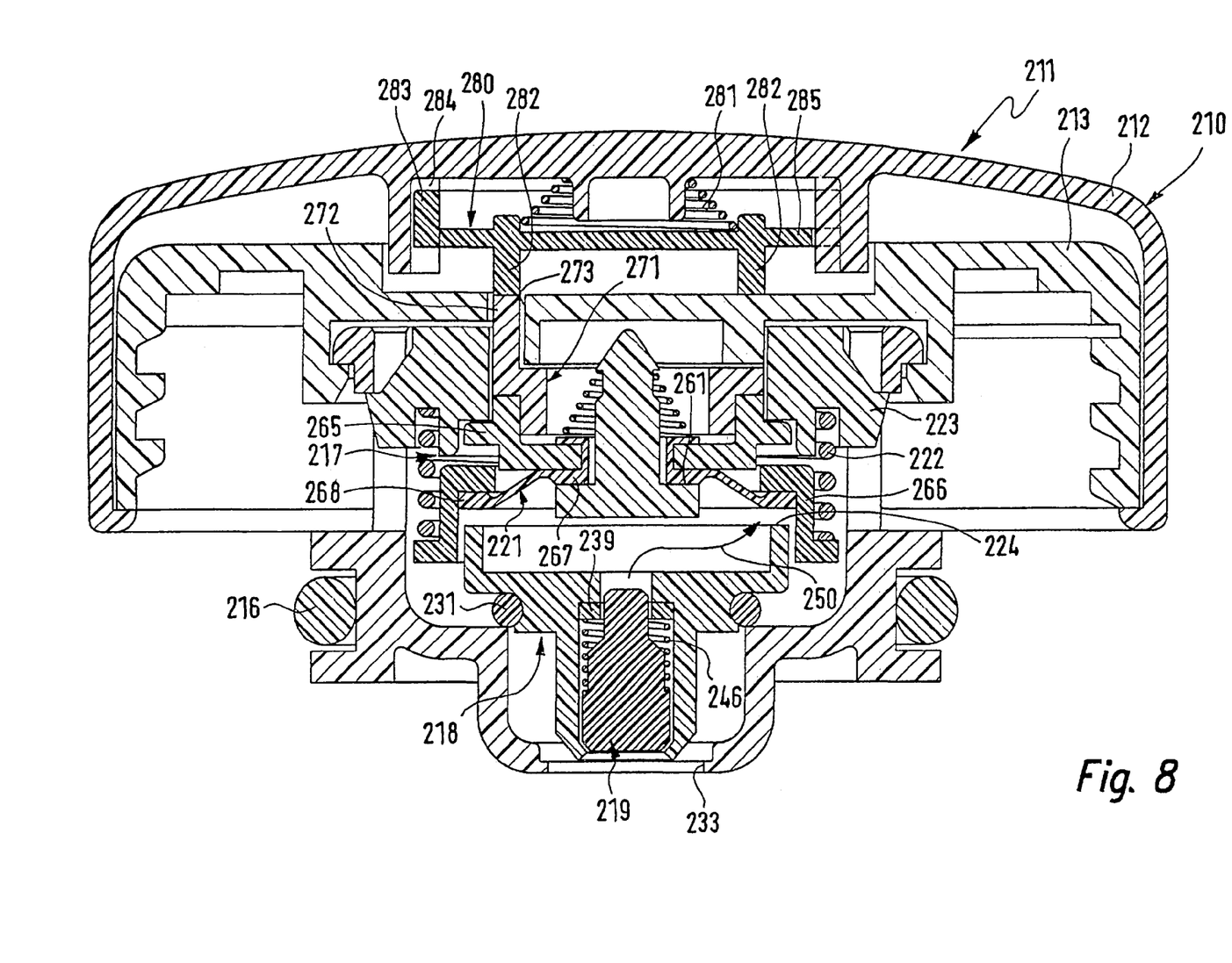
FIG. 8 shows the pressure cap as in FIG. 6 in a position after the pressure inside the tank exceeds a first threshold value.

If the pressure inside the radiator continues to rise, i.e. above the first predetermined first threshold value (such as 1.4 bar), valve assembly 215 reaches the operating state shown in FIG. 8 in which—due to the increased pressure inside the radiator the radially outer sealing edge 268 of the first ring seal 221 of the radially outer valve body part 266 of first valve body 217 lifts against the effect of its first compression spring 222 off the first sealing seat 224 of second valve body 218, thus opening the first flow connection 250, such that air from the air cushion above the liquid coolant can flow outside and thus compensate or reduce the overpressure. Due to the overpressure prevailing in chamber 234, the second ring seal 213 of second valve body 218 continues to be pressed against the second sealing seat 232 of inner cap component 214. If this reduces the overpressure again below the first threshold value, the radially outer valve body part 266 again becomes sealingly adjacent to second valve body 218. The anti-rotation means remains activated as before.

If on the other hand, the pressure inside the radiator continues to rise even during or after the air cushion escapes, and if this causes liquid coolant to reach the underside of the second and third valve body 218, 219, the fact that the annular gap 247 is very narrow causes the liquid coolant to back up at the entrance to annular gap 247 and thus dynamic pressure at the full-surface underside of third valve body 219. This dynamic pressure causes the axial movement of third valve body 219 against the effect of its second compression spring 246, at whose end the third sealing seat 243 of third valve body 219 adjoins the third ring seal 239 of second valve body 218 and closes the first flow connection 250 (see FIG. 9).

Figure 9:
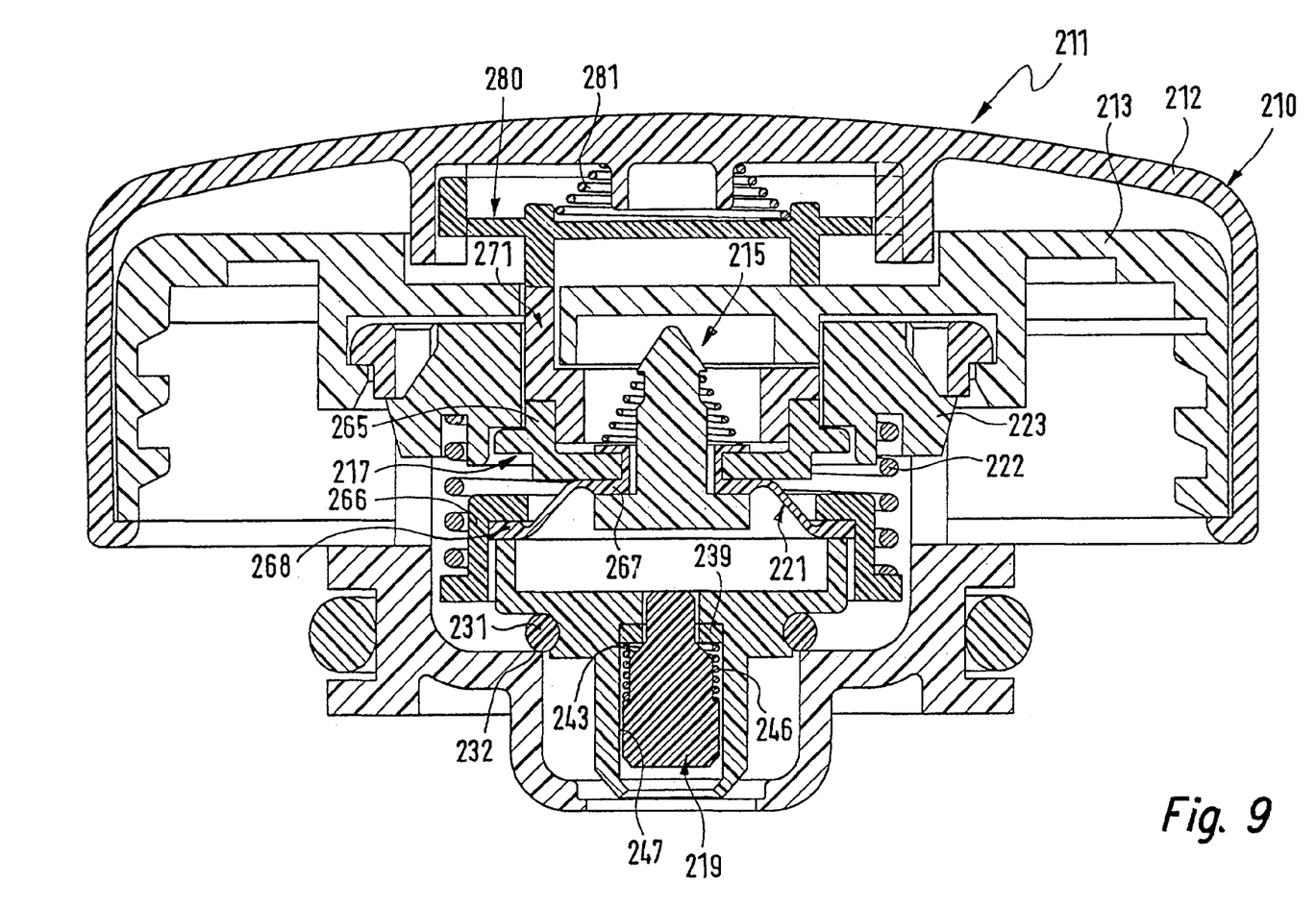
FIG. 9 shows the pressure cap as in FIG. 6 in a position after the pressure inside the tank exceeds a second threshold value and dynamic pressure prevails.

The closing of the first flow connection 250 between the second and third valve body 218, 219 causes the pressure in chamber 234 to drop to a point below the said threshold value, such that the radially outer valve body part 266 of first valve body 217 is moved toward the second valve body 218 under the effect of the first compression spring 222. This state is also shown in FIG. 9. If the cooling of the vehicle's radiator causes the pressure inside the radiator to drop and the liquid coolant to return again, the third valve body 219 is returned under the effect of its second compression spring 246, such that the first flow connection 250 in this region is opened again, as shown in FIG. 6.

Figure 10:
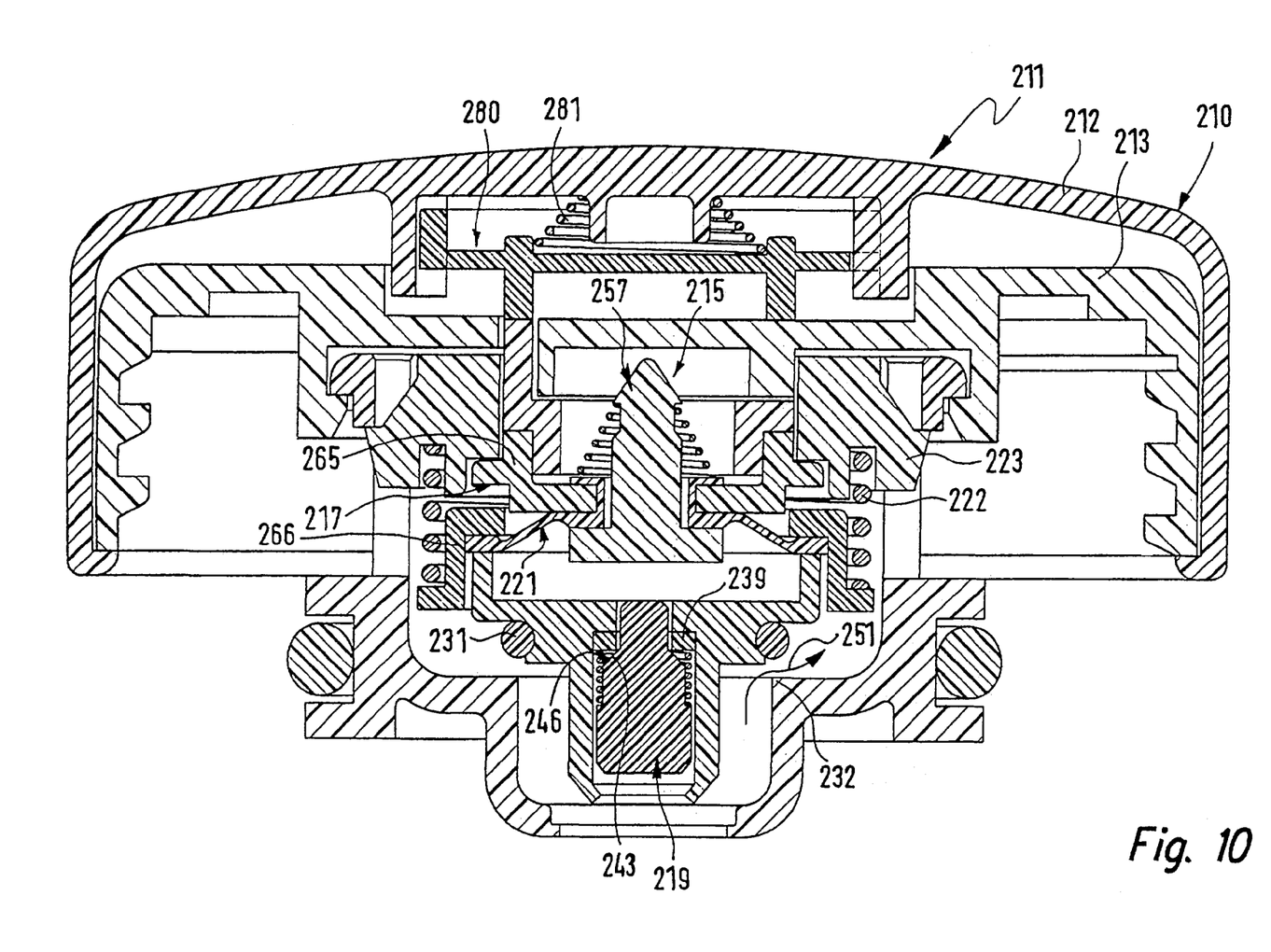
FIG. 10 shows the pressure cap as in FIG. 6 when the pressure inside the tank has exceeded a third threshold value which constitutes the safety limit.

If on the other hand, the pressure inside the radiator continues to rise and the threshold value that constitutes the upper safety limit is exceeded, the second valve body 218 is lifted against the pressure of the first compression spring 222 bearing on the radially outer valve body part 266 of first valve body 217 is lifted off the second sealing seat 232 on inner cap component 214, such that the second flow connection 251 is opened and the said overpressure can be reduced (see FIG. 10). The anti-rotation means remains to be activated. This allows the said overpressure to be reduced via the second flow connection, after which the valve bodies can be returned via the different operating states by the different compression springs and coupling insert 280, as shown in FIG. 6.

If the lower claws 283 of coupling insert 280 are radially offset in relation to recesses 274 in locking element 210, it is enough to turn handling element 210 to bring claws 282 and recesses 273 to mesh again, such that the tightened compression spring 281 returns the coupling element into the activated position against the direction indicated by Arrow A.

Valve assembly 215 is returned to the initial position shown in FIG. 6 only when the pressure inside the radiator ranges between a vacuum threshold value and a first overpressure threshold value. Such pressure conditions prevail, for example, when a vehicle is parked for a long period of time or when the vehicle is driven while the coolant inside the radiator is sufficiently cooled by the headwind and/or the fan. If the vehicle is parked after a long drive, the pressure may rise inside the radiator causing the contents of the radiator (air, water or water vapour) to flow into valve assembly 215. If as a result of this after-heating effect, the coolant volume expands so much that it exceeds the volume of the radiator, this would necessarily lead to a discharge of coolant. This undesirable effect is prevented as described above when the valve assembly is in the operating state shown in FIG. 7 to 9. If in this operating state, the pressure in the cooling system continues to rise in an uncontrolled fashion, leakages and other detrimental effects due to excessive demands on the radiator and/or its hose connections must be prevented. These effects are prevented through the second valve step as shown in FIG. 4, where the radiator pressure is limited to a predetermined safety threshold value.

If there is a vacuum inside the radiator, and if this vacuum falls below a predetermined vacuum threshold value, sealing seat 261 of vacuum valve body 257 is lifted off the underside of the radially inside sealing edge 267 of the first ring seal 221 of first valve body 217 toward the inside of the radiator. Vacuum pressure valve 257 is lowered against the bias of third compression spring 259, such that a flow connection (not shown) is opened between the inside and the outside of the radiator.

The invention claimed is:

1. A pressure cap for openings in tanks, in which an operating pressure prevails, the tank defining a neck, the pressure cap comprising:

an outer cap component provided with a locking element for connection to the tank neck, a handling element rotatably mounted relative to said locking element, and anti-rotation means provided with a coupling insert, held non-rotatably in said handling element and axially moved back and forth for the releasable anti-rotational connection of said locking element and said handling element;

an axial first compression spring;

a valve assembly containing a valve body movable back and forth for releasing and blocking flow connections between the inside and outside of the tank as a function of said operating pressure and;

a guidance element provided between said valve body and said coupling insert, wherein:

one end of said guidance element sits on said valve body and the other end of said guidance element is axially moved relative to said coupling insert, and engages in same;

said axial first compression spring is provided between said valve body and said coupling insert;

the axial engaging and disengaging movement of said coupling insert is derived from the pressure-dependent axial movement of said valve body; and said guidance element is axially moveable and adapted to be coupled with said coupling insert in the direction of the effect of said axial first compression spring.

2. The pressure cap according to claim 1, further comprising:

a second compression spring; and an inner cap component, wherein:

said second compression spring is provided between said guidance element and said inner cap component.

3. The pressure cap according to claim 1, wherein:

axially extending teeth are provided on the outer circumference of said coupling insert and on the inner circumference of said locking element.

4. A pressure cap for openings in tanks, in which an operating pressure prevails, the tank defining a neck, the pressure cap comprising:

an outer cap component provided with a locking element for connection to the tank neck, a handling element rotatably mounted relative to said locking element, and anti-rotation means provided with a coupling insert, held non-rotatably in said handling element and axially moved back and forth for the releasable anti-rotational connection of said locking element and said handling element;

a guidance element; and a valve assembly containing a valve body movable back and forth for releasing and blocking flow connections between the inside and outside of the tank as a function of said operating pressure, wherein:

said guidance element is provided between said valve body and said coupling insert, one end of which adjoins said valve body and the other end of which adjoins said coupling insert;

the axial engaging and disengaging movement of said coupling insert is derived from the pressure-dependent axial movement of said valve body;

said coupling insert and the end of said guidance element which faces said coupling insert have mutually adjoining fingers which engage in axial recesses of said locking element; and said fingers of said guidance element push said axially inward-directed fingers of said coupling insert out of said recesses in said locking element, and continues to effect pushing until said guidance element strikes said locking element.

* * * * *